(12) United States Patent
Hinks

(10) Patent No.: US 10,308,370 B2
(45) Date of Patent: Jun. 4, 2019

(54) UNUSUAL STATE ALARM AND RECOVERY DIRECTOR

(71) Applicant: William L. Hinks, Akron, OH (US)

(72) Inventor: William L. Hinks, Akron, OH (US)

( * ) Notice: Subject to any disclaimer, the term of this patent is extended or adjusted under 35 U.S.C. 154(b) by 29 days.

(21) Appl. No.: 15/615,548

(22) Filed: Jun. 6, 2017

(65) Prior Publication Data

US 2018/0086478 A1    Mar. 29, 2018

Related U.S. Application Data

(60) Provisional application No. 62/349,098, filed on Jun. 12, 2016.

(51) Int. Cl.
*B64D 43/02* (2006.01)
*G01C 21/16* (2006.01)

(52) U.S. Cl.
CPC ........... *B64D 43/02* (2013.01); *G01C 21/165* (2013.01)

(58) Field of Classification Search
CPC .............................. B64D 43/02; G01C 21/165
See application file for complete search history.

(56) References Cited

U.S. PATENT DOCUMENTS

| | | | |
|---|---|---|---|
| 1,885,578 A | 11/1932 | Boykow | |
| 2,139,694 A | 12/1938 | Reid | |
| 2,182,706 A | 12/1939 | Shanley | |
| 2,277,625 A | 3/1942 | Baynes | |
| 2,504,062 A | 4/1950 | Alkan | |
| 2,699,065 A | 1/1955 | Blair | |
| 3,082,622 A | 3/1963 | Andrew | |
| 3,630,169 A | 12/1971 | Corey | |
| 3,654,443 A | 4/1972 | Dendy | |
| 4,027,839 A | 6/1977 | Quinlivan | |
| 4,435,695 A | 3/1984 | Maris | |
| 5,797,105 A * | 8/1998 | Nakaya | G01P 5/165 244/177 |
| 2002/0169525 A1* | 11/2002 | Cronin | B64D 43/02 701/6 |
| 2007/0068273 A1* | 3/2007 | Cunningham | G01L 3/247 73/781 |
| 2012/0078540 A1* | 3/2012 | McIntyre | G01P 5/16 702/50 |
| 2012/0180581 A1* | 7/2012 | Foster | B64D 43/02 73/865.6 |

(Continued)

OTHER PUBLICATIONS

"Pitot Tube", all pages, published date unknown, date retrieved online Sep. 19, 2018, https://www.grc.nasa.gov/WWW/k-12/VirtualAero/BottleRocket/airplane/pitot.html.*

(Continued)

*Primary Examiner* — Calvin Cheung

(57) ABSTRACT

An inexpensive stall warning device for the instrument panel of an airplane or glider operates on the principle of balancing dynamic pressure against normal acceleration forces. It requires only static and pitot pressure inputs and electric power and employs a differential pressure transducer, MEMS rate gyros and accelerometers. These sensors will be monitored by a microprocessor to derive the aerodynamic states of the aircraft, thereupon issuing explicit display and vocal announcements to a pilot to prevent or guide recovery from a stall or spin state as well as overspeed or spiral dive.

7 Claims, 3 Drawing Sheets

(56) References Cited

U.S. PATENT DOCUMENTS

| | | | |
|---|---|---|---|
| 2014/0244078 A1* | 8/2014 | Downey | G05D 1/0055 |
| | | | 701/11 |
| 2014/0257745 A1* | 9/2014 | Schegerin | G01P 13/025 |
| | | | 702/144 |
| 2015/0057960 A1* | 2/2015 | Dupont De Dinechin | ............ |
| | | | G01P 13/025 |
| | | | 702/98 |
| 2016/0041561 A1* | 2/2016 | Davies | G05D 1/0676 |
| | | | 701/6 |
| 2016/0266164 A1* | 9/2016 | Ellison | B64D 43/02 |
| 2017/0316133 A1* | 11/2017 | Abramov | G06F 17/13 |
| 2018/0038720 A1* | 2/2018 | Wohlford | G01P 21/02 |

OTHER PUBLICATIONS

"Bernoulli's Equation", all pages, published date unknown, date retrieved online Sep. 19, 2018, https://www.grc.nasa.gov/WWW/k-12/VirtualAero/BottleRocket/airplane/bern.html.*

William Strunk Jr. and E.B. White, The Elements of Style, all ages, 1975.*

\* cited by examiner

UNUSUAL STATE ALARM AND RECOVERY DIRECTOR

BACKGROUND OF THE INVENTION

This invention relates to the art of stall indicators or warning devices for use in fixed-wing aircraft. A sample of the multitude of stall warning devices or systems to be found among the US Patents is listed in the Information Disclosure Statement.

Unexpected wing stall during aircraft flight operations is a serious phenomenon that has led to a significant proportion of small aircraft accidents and deaths. At busy or stressful times, a pilot may approach this condition without awareness, even though an alert pilot can notice certain signs of impending stall. Typically, this condition occurs at low altitude while banking for a turn in the "pattern" prior to landing, especially under gusty wind conditions that can result in sudden changes of airspeed. Lift diminishes and drag increases, snowballing the condition. Stall can also happen when pulling out of a dive or other condition of increased acceleration (Gs) due to excessive pitch control action. Generally, the nose, and frequently one wing, of the aircraft drops, more or less suddenly, and it is possible that the aircraft may go into a spin. The pilot must react quickly (at least to ease the stick forward to reduce angle of attack), but he may not if surprised.

Specifically, stall of a fixed-wing aircraft is the condition where the angle of onrushing airflow relative to the wing chord (the "angle of attack", i.e., AoA) exceeds the angle of maximum lift, causing separation of the airflow from the wing surface and loss of lift. In particular, it happens when attempting to fly the aircraft below the airspeed (the "stall speed") that develops just enough lift to support the effective weight (under G-loading) of the aircraft at the angle of attack of maximum lift.

It is common to provide some kind of automatic stall sensor and alarm system to bring an impending stall to the instant attention of the pilot so that s/he will react with appropriate evasive action. However, there are some production and experimental aircraft that do not have stall warning devices. Most gliders don't, one reason being that they usually have removable wings that make placement and reconnection of such devices inconvenient or unreliable, or subject them to damage. Experimental and ultralight aircraft frequently don't have stall sensors because of cost, uncertainty of calibration, or the sense that "they're not needed".

Numerous devices or combinations of sensors, computers and attention-raisers have been employed to warn of such an impending or occurring event so the pilot can take control action to avert or correct the outcome. The most direct approach to sensing stall is to measure the angle of attack that the wing experiences, so impending stall is often sensed by monitoring critical changes in airflow or pressure distribution relative to the wing leading edge, as done by the first four patent references.

One type frequently seen on smaller general aviation is based upon a sensor located upon a wing in a position that can directly detect changes in airflow dependent upon changes in the angle of attack. Specifically, near the leading edge of the wing, a precisely located open slot leading to a resonance chamber will emit a loud warning sound when stall is impending, or a vane type facing into the airflow will flip a switch when the critical angle of stall is approached (Blair and Andrew), or pressure or flow sensors at two spaced locations on the leading edge are differentially compared to obtain a signal dependent upon angle of attack (Maris and Corey).

Several other basic types of devices or systems can accomplish the stated purpose. The Dendy and Quinlivan patents are typical of systems that employ a multiplicity of sensors that may be located at various control locations on an aircraft, their outputs all combined in a computer to yield a signal on an appropriate indicator to command the pilot's attention or even take automatic corrective measures. This type tends to be seen on large commercial or military aircraft.

The remaining five cited patents are all based upon a different principle from those that directly are mounted near or on a wing to determine angle of attack from the airflow. Those five may share some of the types of sensing and computation involved in Dendy and Quinliven, but are mostly located in a single device on the instrument panel of the aircraft and primarily have connections to the usual static and pitot (dynamic) pressure sources, plus a battery or other source of electricity, and they all sense normal accelerations, parallel to the lift vector. Specifically, these five patents all operate on the principle of balancing the forces of normal accelerations due to gravity and maneuvering (i.e., G-forces) against a force proportional to dynamic pressure (which in turn is proportional to the square of airspeed), and therefrom developing a measure of angle of attack.

The current invention is similar in its underlying use of the same basic principle as the last five cited, but an optional new physical implementation and important safety features are added in the instant device to enhance that function and to extend warnings to other unusual and dangerous aerodynamic events.

SUMMARY OF THE INVENTION

The purpose of the invention is to provide a compact, inexpensive, and lightweight dangerous-state warning and recovery director device that can be easily fitted to an aircraft, requiring no modifications of structure, but only inputs of static and pitot pressure plus electric supply or an included battery. It is intended for simply configured light airplanes and gliders with a minimum of control surfaces such as flaps or spoilers that can modify flying characteristics. It is further intended to provide new means of correcting certain functional deficiencies inherent in the previous art in its category, and to provide enhanced warning and urgent vocal directives to aid a pilot toward action to recover from dangerous aerodynamic states, including, besides stall and spin, other conditions that a VFR pilot may inadvertently encounter, such as non-visual conditions that can lead to overspeed and a deadly spiral dive.

The initial representation of the invention employs a sensitive mass as in FIG. 3 that is suspended against gravity and acceleration (total G-forces) by the same dynamic pressure that produces lift upon the aircraft as a whole. Differences in acceleration (Gs) between the suspended mass and the aircraft due to changes in AoA cause the mass to rise or fall within its housing, triggering a warning when the AoA approaches the stall point. It is later demonstrated that the function of the apparatus of FIG. 3 can be separated into two parts.

BRIEF DESCRIPTION OF THE DRAWINGS

FIG. 4b indicates the orientation of the diaphragm/mass unit of the airplane under the same conditions as in FIG. 4a.

DETAILED DESCRIPTION OF THE INVENTION

Figure 1:
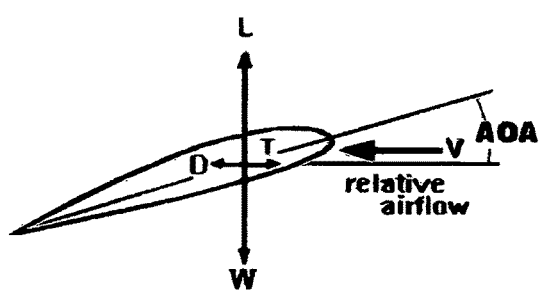
FIG. 1 is a representation of a wing airfoil advancing horizontally through the air mass.

FIG. 1 schematically shows a cross-sectional airfoil of a wing in a straight and level flight path (i.e., horizontally) moving to the right at velocity V with its median line or chord tilted at an angle of attack (AoA) relative to the free stream flow of air, resulting in a force applied to the wing. This total aerodynamic force on the wing of a fixed-wing aircraft is resolved into the orthogonal vector components lift and drag. Lift L is the force upon the wing normal to the airflow vector, while drag is defined as the force on the wing in line with the airflow. The weight W vector is vertically down. If an engine is operating there is a forward thrust vector T more or less in line with the horizontal.

Lift and drag can be expressed by the equations:

$$L=Pd*A*Cl(AoA), D=Pd*A(Cd(AoA)), \text{ where } Pd=(\frac{1}{2})*r*V^2$$

There are relatively small contributions to lift from the fuselage and elevators, but it does not change the argument to discuss the wing alone. Thus, A is the plan-wise area of the wing, and Cl(AoA) is the coefficient of lift and Cd(AoA) is the drag coefficient for any particular wing in question. The dynamic pressure Pd is proportional to the mass density r of the air and the square of airspeed V, and is a measure of the kinetic energy of the air impacting the aircraft. As an example, if airspeed at stall is 25 MPH (36.7 ft/sec), as may be the case for some ultralight aircraft, then the magnitude of dynamic pressure at this airspeed with the air density at standard atmospheric temperature and pressure (32 deg. F. and 29.92"Hg) is:

$$Pd=(\frac{1}{2})(0.00251 \text{ slugs/cu-ft})(36.7 \text{ ft/sec})^2=1.69 \text{ lb/sq-ft}.$$

Figure 2:
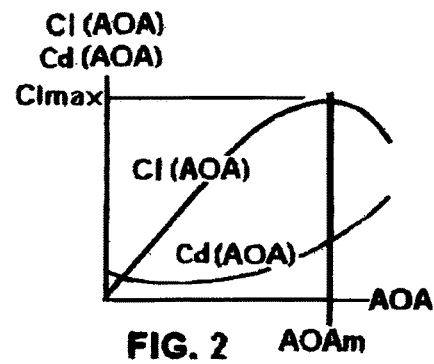
FIG. 2 is a plot of typical coefficients of lift and drag vs. angle of attack of a wing.

As seen in FIG. 2, Cl(AoA) is a generally monotonic function of AoA up to its maximum value Clmax=Cl(AoAm) at the critical angle of attack, AoAm. Clmax is typically equal to 1.3 or so (more with flaps) at a value of AoAm typically about 15 degrees. At larger values of AoA, lift drops more or less quickly, depending upon the wing design. Cd(AoA) is much smaller in magnitude, increasing rapidly near the critical angle of attack.

If the magnitude of lift L is equal to the magnitude of weight W (and T is horizontal), the aircraft will experience no additional acceleration up or down. If speed V decreases under these conditions, it is necessary for AoA to increase to maintain this balance. Obviously, there is some airspeed Vs (the minimum stall speed) at which the lift generated at Clmax is just equal to and capable of supporting the aircraft weight in straight and level flight (ignoring the possibility of a small upward component of engine thrust). If the speed becomes lower, further increase in AoA will not increase L, and the aircraft will drop (stall). As it drops, the relatively rising airflow will tend to increase AoA further yet, aggravating the stall unless the pilot takes control.

Figure 3:
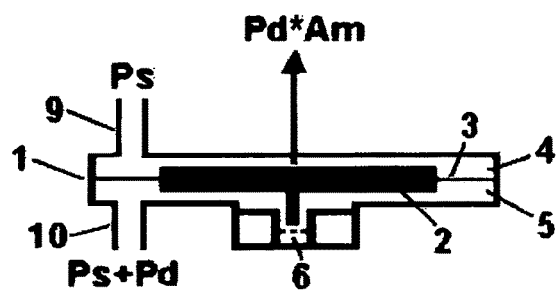
FIG. 3 shows the principle of a diaphragm/mass unit with a sensitive mass suspended by dynamic pressure acting upon a diaphragm.

In the schematic cross-sectional view of FIG. 3, the diaphragm/mass unit 1 has a mass element 2 (a metal disc) suspended by a thin circular diaphragm 3 enclosed in an airtight case with a top half 4 and bottom half 5.

The diaphragm is made of a thin flexible material such as Mylar, or metal foil with concentric circular convolutions to engender flexibility in the axis perpendicular to its extent. The absolute pressure above the diaphragm is simply static pressure Ps from input port 9. The cavity below the diaphragm is connected to a pitot tube 10 of the aircraft, so the absolute pressure there is static plus dynamic pressure (Ps+Pd). (A pitot tube is simply a small open-ended tube oriented forward into the airstream so that dynamic pressure plus static pressure develops in it as the impacting air decelerates to zero relative speed. A pitot tube is already provided in any aircraft to supply its airspeed indicator.) The static pressure components above and below the diaphragm cancel, so net dynamic pressure Pd acts upward on the diaphragm area to create the force=Pd*Am that supports the weight Wm of the mass element.

The function of the device in short: the small sensitive mass is lifted against gravity and acceleration (total G-forces) by the same dynamic pressure that produces lift upon the aircraft as a whole. In a sense, this suspended mass acts like an analog of the aircraft mass: it essentially parallels the flight path of the aircraft with small differences. Those small differences in the tracking relationship are related to changes in the coefficient of lift force on the wing that result from changes in the angle of attack. In other words, differences in acceleration (Gs) between the suspended mass and the aircraft cause the mass to rise or fall within its housing, triggering a warning when the AoA approaches the stall point.

The stall sensor may be calibrated so that in straight and level flight (1 G), it will produce a warning if airspeed drops below Vsw, where Vsw is selected to be somewhat above minimum stall speed Vs (enough to provide ample warning). At airspeed Vsw (when the associated AoA=AoAw, somewhat less than the stall angle AoAs), there is a resulting dynamic pressure Pdw acting upon the diaphragm 3, and its effective area Am is made to be just sufficient to develop the force Pdw*Am to support the weight Wm of the mass element 2 (its axis will then be essentially vertical, as shown). In equation form, to achieve calibration, Am and Wm are selected so that Am/Wm=1/Pdw.

The mass element and the mass of the whole aircraft are both suspended against the forces of 1 G by the same dynamic pressure Pdw when the angle of attack is AoAw In other words, the accelerations Z of the mass and the aircraft are made equal at 1 G, i.e. Zm=Za(Clw), where the value of the lift coefficient at this point, Cl(AoAw) is referred to as Clw.

After calibration, if the aircraft slows to an airspeed incrementally slower than Vsw (the angle of attack will still be slightly less than the critical stall angle AoAs), then the resulting incrementally lower dynamic pressure will no longer support the mass so that it will drop in its housing. On the other hand, if the pitch of the aircraft is increased while airspeed remains unchanged, the resulting increase in AoA and coefficient of lift (less than stall) would accelerate the aircraft mass upward while the suspended mass was not accelerated, so that it would again drop relative to its housing.

In either case, the relative downward motion of the mass will be detected by a sensor device 6, e.g., a photo-switch as in FIG. 3, to initiate a warning that the critical angle of attack AoAs is being approached. The photo-switch employs a thin opaque probe extending downward from the center of the mass 2 to cut off a beam of light that crosses a gap between an LED and a photo-transistor (more later). Other methods that can produce a proportional signal rather than an ON/OFF switch will later be shown to be superior.

The stall sensor unit is fixed in the aircraft and adjusted so that the plane of its diaphragm is parallel to the line of flight (the direction of motion, horizontal for straight and level flight) when the angle of attack between the wing chord line and the line of flight is AoAw, Thus, the sensor diaphragm 3 is tilted clockwise through the angle AoAw from parallelism with the wing chord. It is noted that its sensitive axis is then parallel to the airflow-normal (i.e., lift) vector of the aircraft.

It is noted that the function of the diaphragm 3 is to convert dynamic pressure to force at an application position upon a thereby suspended mass element 2 that can move in a direction normal to the lift vector.

Other well-known means of accomplishing that noted conversion include an aneroid bellows as commonly used in barometers and airspeed indicators, and a piston moving in a cylinder. This function may involve the intervention of a leverage configuration between the pressure-to-force conversion means and the point of application to the mass position, as seen in FIGS. 1 and 2 of referenced U.S. Pat. No. 2,504,062.

That configuration has the added capability of providing for calibration with various effective values of mass by locating the mass at various positions along a lever arm to effectively change the value of the dynamic force/mass ratio. Whatever the linkage, the mass still is connectedly-arranged to move in response to the dynamic forces in a direction substantially parallel to the lift vector at the stall warning level of AoA.

Figure 5:
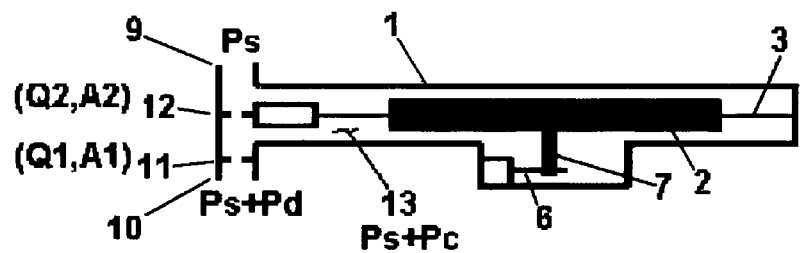
FIG. 5 is a schematic depiction of the use of flow restrictors to reduce the level of dynamic pressure within the diaphragm/mass unit and it also indicates sensing means.

Another approach to increasing the adaptability of a given Am/Wm ratio is seen in FIG. 5, which schematically indicates a variable pressure divider as means of reducing the level of pressure applied to the diaphragm to a fixed percentage of the true dynamic pressure. The effect is the same as if the area Am of the diaphragm were reduced, so that a large Am designed for low dynamic pressure stall speeds becomes adapted to the higher dynamic pressure associated with higher stall speeds. Input duct 10 has a mass flow of air Q through it from the pitot source at pressure Ps+Pd (static plus dynamic) at the bottom, through a first restricting orifice 11 to a region connected to the bottom diaphragm cavity 13 with pressure Ps+Pc. Beyond that, the air moves through a second restricting orifice 12 to the static source 9 at drain pressure Ps, connected to the cavity above the diaphragm. The two orifices have areas A1 and A2, respectively, and each will have a flow rate approximately proportional to the orifice area and the square root of the pressure drop across it. At steady-state, the air mass flow rate is the same through both orifice 11 and orifice 12; i.e.: Q=Q1=Q2, or, $$Q=k*A1*(Pd-Pc)^{1/2}=k*A2*(Pc-0)^{1/2}$$

where static pressure Ps is subtracted from all pressures, yielding gage pressures Pd, Pc, and 0, since flow under these conditions substantially depends only on difference in pressures. The equation can be solved to get the lower cavity gage pressure supporting the mass:

$$Pc=Ka*Pd, Ka=A1^2/(A1^2+A2^2)$$

Thus by varying orifice area A1 or A2 or both, it is possible to change the constant of proportionality Ka to reduce the actual dynamic pressure Pd at the stall warning point of an aircraft to the pressure Pc that will just support the mass element at 1.0 G during calibration. It is desirable to keep the flow Q relatively small by minimizing the orifice areas while maintaining the desired ratio, so that negligible pressure drop is seen in the tube connecting to the pitot. On the other hand, if restrictions are too small relative to the volume of the cavities, they could cause excessive time lags as well as being prone to clogging.

In FIG. 5, the thin Mylar diaphragm permits a small amount of movement with essentially no restraint. Arranged below the center of the mass/diaphragm unit is one of several options to sense dynamic force or position. The type of sensor shown is specifically a force sensor in the form of a strain gage. A downward extension 7 from the center of the mass 2 connects to a small, thin and flexible cantilever beam 8 of known stiffness that resists the up or down dynamic force developed upon the diaphragm, and its strain in doing so is imparted to the strain gage on its surface, developing a calibrated voltage proportional to the dynamic force, positive or negative, to be passed to the microprocessor. Alternatively, for the type of diaphragm made of metal foil, its inherent structural compliance due to the net force upon it will result in metal strain that may directly support a strain gage on its surface. A piezoelectric or other type of force sensor might instead be used.

In an alternate implementation, the downward extension 7 of the mass 2 may connect to a calibrated spring, moving it by a distance up or down proportional to the developed force, that distance being measured by distance-measuring means to develop a signal for conversion to force values by the microprocessor. As previously mentioned, an aneroid bellows arrangement can conveniently be used in place of a diaphragm as the pressure-to-force converting device, having its own calibrated spring function for measurement by distance- or strain-measuring means.

The sensor type in FIG. 3 is the photo-switch 6 in the form of a U laid upon It's side. An LED in one leg of the U-shape emits a narrow IR beam across the gap between the legs of the U, to be sensed by a phototransistor on the opposite leg that remains on until an interruption in the beam occurs. It may be possible to develop a signal proportional to movement with this kind of photocell arrangement; otherwise it can act as a simple on/off switch. Then, however, dynamic force cannot be measured between the ON and OFF states. This would represent a severe limitation as will be shown.

If an airplane always flew straight and level in an un-accelerated condition, stall could be monitored by simply measuring airspeed (via measuring dynamic pressure) and issuing a warning signal if it dipped close to stall speed. However, stall can occur at any orientation of an aircraft and any airspeed; in a banking turn, or in the upward-curving pullout of a dive, for instance. The centripetal acceleration in such maneuvers generally results from greater lift on the wings, which is balanced reactively by increased effective weight. For instance, at a bank angle of 60 degrees, lift must double. At the Clmax condition, velocity must increase to produce this greater lift. That is, the stall speed rises under these accelerated conditions.

Figure 4A:
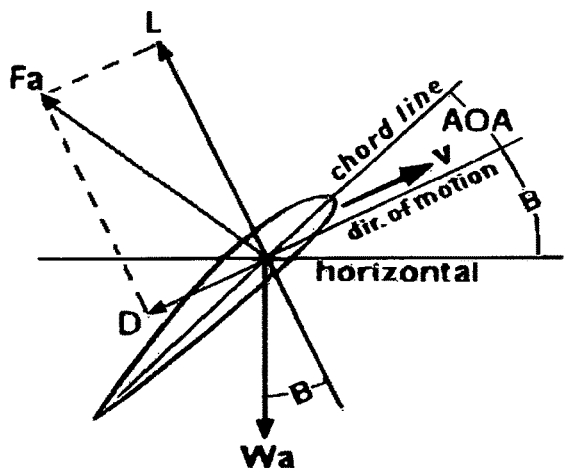
FIG. 4a shows the wing of an airplane at an arbitrary condition of flight path and normal acceleration.
Figure 4B:
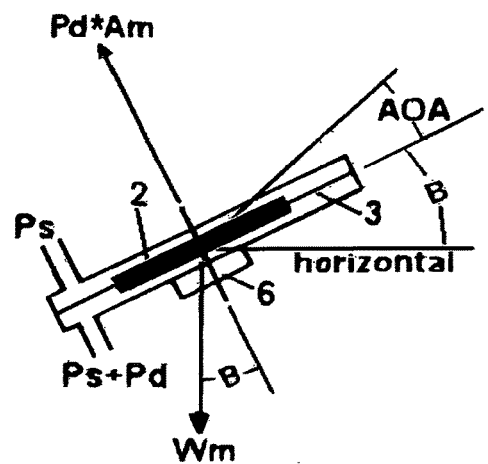

The general case of normal acceleration near stall is considered with reference to FIGS. 4a and 4b, schematic views of the airfoil (FIG. 4a) and diaphragm/mass unit (FIG. 4b) running into the relative wind at an angle of attack AoA. Arbitrarily, the aircraft direction of motion is inclined upwards at the flight angle B with respect to horizontal (more generally, the aircraft may also have some roll angle, not shown).

For any flight configuration, the difference dZ between the normal axis acceleration of the mass Zm and the acceleration of the aircraft Za (where Za is a function of any value of the coefficient of lift Cl) can be expressed as $$dZ=Zm-Za(Cl),$$

Newton's Law permits this equation of the two accelerations to be rewritten by substitution of the net forces in the normal direction divided by the mass of the sensor element or of the aircraft, respectively. As seen in FIG. 4a/b, these net forces are the lifting forces created by dynamic pressure acting upon the effective area of the diaphragm 3 in the case of the sensor and upon the wing area A at some value of lift coefficient Cl, less the respective component of weight acting along the normal axis of either, i.e., the two forces are $$(Pd*Am-Wm*\cos B) \text{ and } (Pd*Aw*Cl)-Wa*\cos B).$$

Thus, the difference of accelerations as represented with those forces divided by the respective masses (Wx/g) can be written as:

$$dZ=[(Pd*Am-Wm*\cos B)*g/Wm]-[(Pd*Aw*Cl)-Wa*\cos B)*g/Wa]$$

The gravity terms cancel out for all orientations and the equation can be simplified to:

$$dZ=[Am/Wm-Aw*Cl/Wa]*g*Pd$$

It can be seen that the condition of equality of the accelerations, i.e., dZ=0 when Cl(AoA)=Cl(AoAw) is independent of dynamic pressure Pd (i.e., airspeed) and pitch orientation. Therefore, calibration in these terms $$Am/Wm=Aw\ Cl(AoAw)/Wa$$

is valid for all cases under any condition of airspeed or orientation.

It is noted that at the point of equality where AoA=AoAw, aerodynamic lift is the maximum established as permissible for any given dynamic pressure. Therefore, during cruising flight, the value of AoA will be less than AoAw and Za will be less than Zm: the suspended mass will be forced up in the device housing, which will stop further motion with an equal and opposite force. At that top position an appropriate sensor will register a safe flight condition.

If AoA is increased, whether due to pilot elevator control to maintain altitude while decreasing airspeed or by pulling out of a dive for instance, or by the effect of a rising gust, the extra lift will increase the normal acceleration Za. In other words, the aircraft flight path will be forced up, tending to cause the bottom of the housing to rise up toward the suspended mass: relative to the housing, the mass tends to fall toward the bottom, and the associated sensor will register an incipient stall if the warning point is reached. From another point of view, when AoA=AoAw and Za=Zm as calibrated, the dynamic pressure force applied to the mass is just enough to support it against the G-forces, and higher G's due to a higher value of Cl(AoA) will cause the mass to "stall" and fall.

As the physical consequence of the equation above within the reference system of the sensor housing, the net acceleration dZ of the suspended mass will be reacted against by stop means within the housing, producing the reactive force $$Fr=(Wm/g)*dZ=Am*Pd-(Wm/Wa)*Aw*Cl*Pd, \text{ or}$$
$$Fr=Fm-Fa, \text{ where}$$

$$Fm=Am*Pd \text{ and } Fa=(Wm/Wa)*Aw*Cl*Pd$$

are respectively the force associated with acceleration of the sensitive mass, and the ratio of masses times the accelerative force upon the airframe. Rearranging, the force upon the airframe is Fa=Fm-Fr=Am*Pd-Fr.

Given that Am is known, if sensor force Fr and dynamic pressure Pd can be measured for any phase of flight, then the value Fa can be calculated, and so can the lift coefficient Cl, which is seen to be proportional to Fa/Pd:

$$Cl=[Wa/(Wm*Aw)]*(Fa/Pd).$$

The positive or negative force Fr, proportional to net acceleration upon the mass, can be measured by some means such as a strain gage arrangement or a calibrated spring and displacement sensor arranged between the mass and the housing stops. Dynamic pressure can be measured by a differential pressure transducer with its two input ports using the available static and pitot inputs, or by employing two absolute pressure transducers and subtracting the static output signal from the pitot output signal.

If all the parameters of the aircraft and the stall sensor were well known, including the lift coefficient function Cl(AoA), then measurement of Fa and Pd would permit calculation of AoA (on the positive slope of Cl(AoA), to determine if the value exceeds the warning level AoAw. However, it is unlikely that these parameters would be known with any significant precision in most cases. But the particular value of AoAw, per se, does not matter: calibration based upon measurements over the range of the coefficient of lift Cl as a function of (Fa/Pd) would provide for the needed warning signal at the level Clw.

Calibration can be done during straight and level flight as before. As airspeed (dynamic pressure) is reduced and AoA is increased to maintain altitude, the microprocessor will continuously sample Pd and Fr as stall is approached and finally ensues. Based upon these measurements, the function Cl(Fr/Pd) will be continuously calculated, thereby mapping it out. Based upon some preset criterion of the margin of warning before stall, the computer algorithm will select and save a value Cl=Clw, the desired stall warning point. After the calibration, in normal flight, continuous measurement of Pd and Fa will lead to continuous calculations of Cl(Fr/Pd) for comparison against the saved warning value.

As described earlier, the condition of equality of accelerations set forth required the mass Wm/g and diaphragm area Am to be chosen (or physically adjusted) such that dZ=0 when the angle of attack is at the desired warning level AoAw for a given airplane, i.e., when the dynamic pressure (via airspeed) is just sufficient to support the accelerated mass at the warning level of AoA. However, given the capability of measuring and calculating Cl, that condition is not required when AoA=AoAw.

The disclosure to this point has relied upon a diaphragm/mass unit similar to those shown in the referenced art in that it physically balances dynamic pressure against normal g-forces to produce the warning signal for a stall. But there is another way to implement this principle: the function provided by such an instrument can be separated into two parts, i.e., first to measure the dynamic pressure with a differential pressure transducer (or 2 absolute pressure transducers) and secondly, to measure the normal acceleration force with a G-meter. It is noted that the described diaphragm/mass unit IS a G-meter if the Ps and Pd pressures are disconnected (as is any instrument that measures the force exerted by a calibrated mass). However an off-the-shelf very inexpensive MEMS-type accelerometer can be used. So instead of physically measuring the net difference between the two forces and feeding an output signal to a microprocessor, the output signals representing dynamic pressure and normal acceleration each can be input to the microprocessor and subtracted there.

Given the lift force L at any time, the normal acceleration Za of the aircraft at any given coefficient of lift Cl will be (according to Newton's Law) as follows:

$$L=Pd*Cl*Aw=Za*Wa/g,$$

$$\text{or } Cl=(Wa/g)/Aw)*(Za/Pd)=K1*(Za/Pd)$$

where K1=(Wa/g)/Aw remains constant unless weight or wing area change, and the coefficient of lift at any moment is proportional to the ratio (Za/Pd). This implies that if the values of acceleration Za and dynamic pressure Pd are measured and K1 is known, then the coefficient of lift can be calculated, the same as above. The constants of proportionality are equivalent: at the same level of acceleration, the ratio of accelerating forces on the aircraft and the mass is Wa/Wm, and therefore L/Fa=Wa/Wm, and in the equation above, since Za=L/(Wa/g), substitution yields the equation Cl=[Wa/(Wm*Aw)]*(Fa/Pd) as before.

This shows the functional equivalence of direct vs. split measurements.

The means for calibration of the system is unchanged: make a flight that exposes the aircraft to the entire range of AoA, including stall, while constantly measuring Za and Pd and therefrom calculating the range of coefficient of lift Cl as a function of (Za/Pd). To do this, the pilot could start straight and level flight a high speed (low AoA) and begin raising AoA while maintaining altitude at lower and lower speed until the aircraft finally stalls.

Then, based upon a criterion that provides ample safety margin for pilot response, a warning value Clw of coefficient of lift is selected. At that point, the ratio Za/Pd is fixed at a value Kw and AoA is at the warning level AoAw, that is, Cl(AoA)=Cl(AoAw). Thereafter, in normal flight, continual monitoring of Cl allows the value to be compared against the warning level Clw. The system works with the coefficient of lift Cl as a function of (Za/Pd) rather than AoA.

Variations must be considered. For most airplanes, in the same configuration the warning level will remain nearly constant for differing values of airspeed and dynamic pressure Pd and orientation. But there are complicating, realistic factors to be considered: changeable parameters, such as weight, loading variations, engine operation, and changes in the coefficient of lift Cl due to rain or insect deposits, flaps or spoilers, and ground effect when taking off and landing. Also, proper action depends critically upon accurate dynamic pressure, requiring good pitot and static port locations and reliability under the weather conditions flown. Some of these factors may be negligible in effect or could be calibrated conservatively for the worst case. Those that produce extra lift (flaps and ground effect upon landing) might be considered to provide an extra safety margin. But these factors actually represent changed lift coefficients, so for those conditions of flight that reduce lift, what really matters is the maximum allowable lift coefficient Clw, not the AoA per se: a particular AoA at a given airspeed could be the same with spoilers either in or out, allowing normal flying in the first case but stall in the second because of reduced Clw.

If the percent change in these values can be estimated (such as weight), they can be input manually to the control panel as direct numbers or as switches to reference stored values, thereby effecting corresponding changes in Clw, the warning signal level. Although more complex, controls or handles for parameters changeable in flight (flaps, spoilers, engine operation) can be sensed and connected into the device. Voice recognition and confirmation via the computer may suffice for simple in-flight inputs. However, care in design would be required to lock-in the correct parameters and minimize the possibility of erroneous inputs. A more extensive overall calibration procedure would involve several different calibration flights to establish different values of Clw for these separate conditions, one of which would be selected at any time via suitable inputs or hard switches.

The disclosed device relies upon inertial properties: a G-meter, and the aircraft mass, supported by the dynamic pressure induced by the deceleration of the air mass. However, it also requires new inertial sensors including accelerometers, rate gyros, and a dynamic pressure sensor.

These new inertial sensors are needed to address functional deficiencies inherent in the previous incarnations of the principle. Specifically, if the pilot fails to take control action following a warning signal, the AoA can continue to increase, bringing Cl(AoA) through its maximum as seen in FIG. 2 and descending into a deep stall with the loss of lift. This reversal of acceleration can cause the unaided stall warning signal to be turned off (Za becoming less than Zm as it is during the ascending part of the coefficient of lift curve) at a time when the aircraft is actually in the stall (if dynamic pressure Pd were affected, that would lend more uncertainty). There are also inherent problems during takeoff and landing when the unaided system can cause a warning signal when airspeed is less than the minimum stall speed.

It is an object of the invention to provide means to correctly maintain a stall signal under these circumstances; and in addition to preventing an erroneous loss of signal, to correctly cease the warning when normal flying resumes. It is a further object to provide explicit verbal suggestions to the pilot regarding appropriate control actions for recovery from a stall or spin situation. Moreover, beyond stall warnings, the system will provide warnings and urgent directives upon the occasion of overspeed and spiral dive as might occur during inadvertent incursion into non-visual conditions.

To provide a continuous warning as long as stall persists, means are applied to sense the disturbance in flight caused by the sudden loss of lift: stall is usually accompanied not only by a drop in flight path, but also by a forward-pitching movement, the first of which can be sensed by accelerometers aligned with the normal and/or longitudinal axes of the craft, and the pitching motion by a rate gyro. Dropping of a wing also frequently occurs, and could be sensed by a roll axis gyro and possibly by a yaw rate gyro, especially if a spin develops. A sequenced combination of these signals will be evidence of a stall that can be processed by specific suitable computation means to deliver the appropriate signal at the appropriate time, including voice prompts for actions such a "left rudder!" or "push stick!" to a surprised pilot at a critical time, aiding recovery after a stall or spin.

That is, with the new inertial sensors and a microprocessor, the warning signals are refined to reflect the actual state of the aircraft: the microcomputer follows the signals from the DMU or G-meter and dynamic pressure transducer, and all the accelerometers and rate gyros through the sequence of events related to a stall. The system can then revert back as the sequence of signals is interpreted to bring it back to the NORMAL state. OVERSPEED and SPIRAL DIVE states will also be provided.

Figure 6:
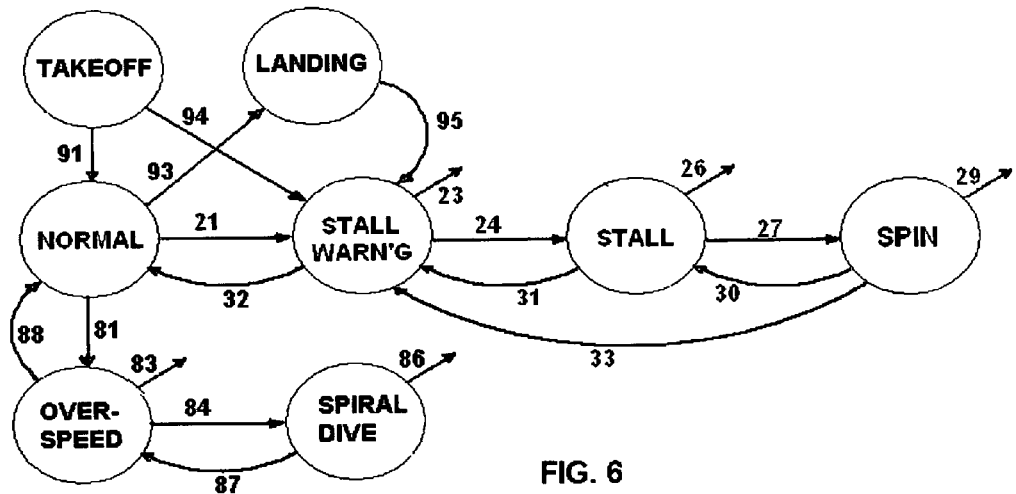
FIG. 6 is a model of the state transition type of algorithm applied to process stall warning and overspeed signals.

The algorithms expressing these events are realized by the State Transition Method, represented by the much-simplified state transition diagram of FIG. 6 in which aerodynamic states of the aircraft at any point in time are represented by circles that are connected by arrows labeled with the events required for transition from one state to another. Upon each such transition, a specific output signal or action may take place, such as an audible or displayed warning.

Following preparatory states involved in turning on the device, i.e., entering setup data, a readiness state, the TAKE-OFF state is entered. During TAKEOFF and LANDING special handling of the sensor sources is necessary to avoid improper warnings: during the start of the takeoff run, dynamic pressure rises from zero to flying conditions and could falsely trigger an alarm, while the reverse situation could happen during landing.

Except for a possible takeoff diverted 94 to the STALL WARNING state, and given the expected adequacy signals 91 including the longitudinal acceleration on the ground prior to liftoff, there would be a transition to the NORMAL flying state. Thereupon, if the coefficient of lift Cl reaches the predefined alarm point as indicated by signals 21 sent from the DMU or normal axis accelerometer Za and the dynamic pressure transducer Pd to the microprocessor, the STALL WARNING state is entered and audible and visual signals 23 are emitted to raise the pilot's attention. During the STALL WARNING state, the same signals and inertial sensor outputs are monitored by the microprocessor to see if Cl drops and the pitch and roll rate gyros detect a nose and/or wing drop while accelerometers indicate a loss of G-force. If so 24, the STALL state will be entered, and the microprocessor will continue the stall warning and may issue vocal directives 26 for specific actions by the pilot depending upon the particular aircraft configuration detected. Beyond that, if a yaw rate gyro indicates sustained yawing as in a spin 27, the SPIN state will be entered, while vocal directives 29 for specific action including left or right rudder will be issued.

From the SPIN state, cessation of yaw rate 30 leads back to the STALL state, or if the inertial sensors also indicate a simultaneous proper combination of the nose pitching down, together with the Cl signal dropping to the warning level 31, the system will return more directly to the STALL WARNING state. Finally, if Cl drops below the warning level 32, the normal flying state 20 is re-entered and the warnings to the pilot are turned off. Variations or other intermediate states and connections may be needed.

If instead, the dynamic pressure transducer indicates an overspeed condition 81, the OVERSPEED state will be entered, with alarms 83 (this is a simplification: there are actually several overspeed states, including maneuvering speed and not-to-exceed speed, and the values for each depend upon the configuration, orientation and accelerations). Alarm values for the various states must be input and/or calculated for each airplane. If accompanied by strong signals 84 from the yaw rate gyros and G-meter, then the SPIRAL DIVE state will be entered with further alarms and directives 86. Again, as corrections 87 and 88 are made by the pilot, returns to NORMAL will occur.

Figure 7:
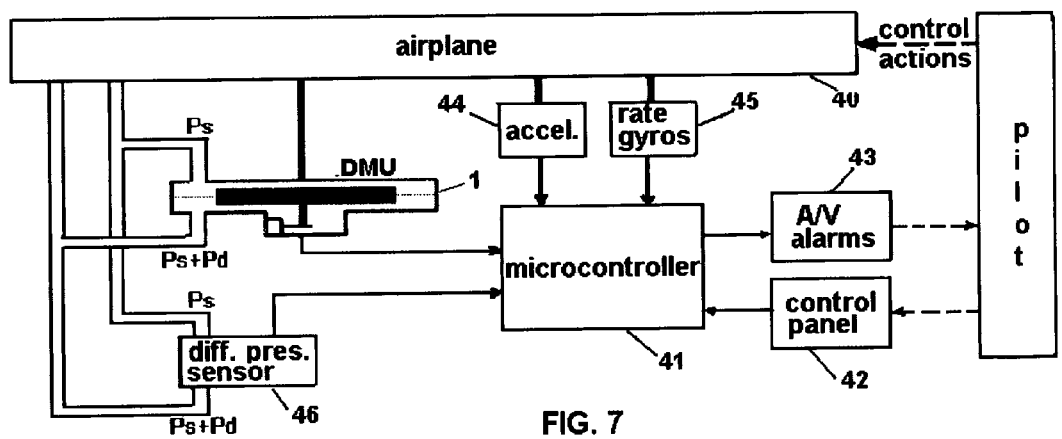
FIG. 7 is a block diagram of the units comprising the invention and their interconnections.

FIG. 7 is a block diagram of the physical units comprising the invention, connected by lines representing electrical and pneumatic signals and other physical causality agents. In particular, the airplane 40 sends static Ps and pitot Ps+Pd pressures to the differential (dynamic) pressure sensor 46 (a diaphragm/mass unit (DMU) 1 as discussed is also shown, although redundant and not necessary with the full implementation of a dynamic pressure transducer and normal axis accelerometer as previously indicated). The airplane also imparts orientation, accelerations and rates to the accelerometers 44 and rate gyros 45 (these inertial sensors are inexpensive micro-electrical-mechanical-systems, i.e., MEMS chips as used in smartphones). The microcontroller 41 also receives setup parameters and commands from the control panel 42, and sends output signals to audio and visual warning transducers 43 including a speaker and a display.

Figures 8, 9:
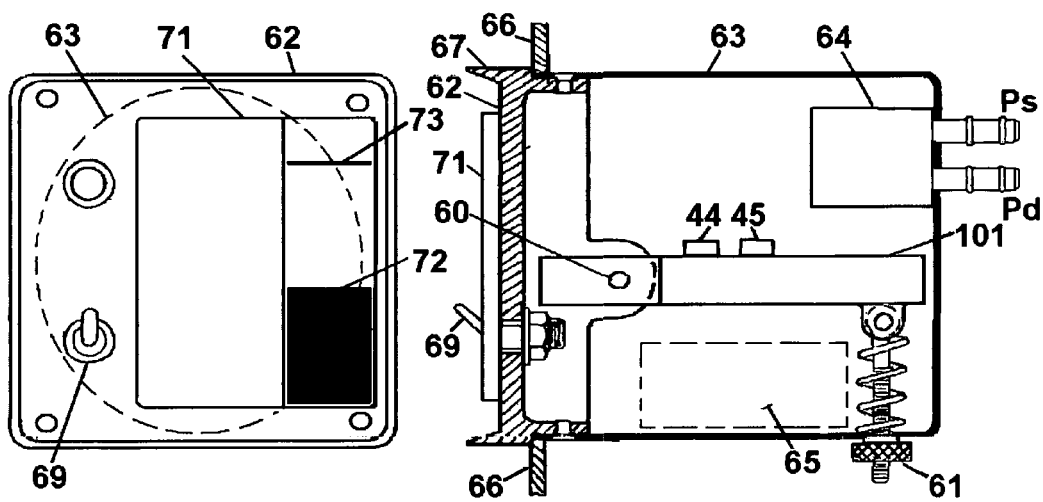
FIG. 8 is a cross-sectional plan view of the preferred complete unusual state alarm and recovery device
FIG. 9 is a view of the front panel of the preferred complete unusual state alarm and recovery device.

FIG. 8 is a side view cross-section of the preferred Unusual State Alarm and Recovery Director device 67 as a unit fitted into the control panel 66 of an aircraft. In order to compensate for some arbitrary tilt of the control panel relative to the aircraft axes, it has a molded plastic front panel part 62 with a mounting flange, and has two narrow lugs 60 that serve as horizontal axis trunnion mounts holding a platform 101 between them, allowing it to be tilted in pitch angle by a screw adjuster 61 at the bottom back. The accelerometer and rate gyro inertial sensors 44/45 are affixed to the platform so they can be physically oriented with the line of flight of the aircraft in the stall warning (Clw) condition, i.e., at the angle AoAw relative to the wing chord (FIG. 4a,b). (If a diaphragm/mass unit were to be used, it would be enclosed within the platform as well). The back enclosure 63 provides mounting for the differential pressure transducer 64 with its static Ps and pitot Pd inputs and has an internal space 65 shown by dashed lines below the platform 101, within which are contained the microprocessor, inertial sensors, speakers and other electronics.

FIG. 9 is a view of the front panel 62 showing the dashed outline of the back enclosure 63, an ON-switch 69 and a touch-panel/display 71 (LCD or OLED). On its right side is a status display that shows a colored area or bar that is set by the computer at every moment to a level up from the base proportional to the coefficient of lift Cl. The 100% point is the stall warning level Cl=Clw, marked by a red line 73. The color of the entire bar will be changed depending upon status: green as long as Cl is less than the warning level, then yellow upon approaching warning level, and finally red before and during actual sensed stall. The warning and stall levels will be accompanied by appropriate audio alarms and vocal exclamations as noted before. The touch-panel/display will also be used in combination with input buttons (not shown) for setup purposes. A small port (not shown) will provide for egress of audio from a speaker within.

The invention claimed is:

1. A dangerous aerodynamic state warning device for an airplane experiencing normal acceleration and accepting static and pitot pressure inputs, comprising:
    a differential pressure sensor that accepts said pressure inputs and outputs a signal representing dynamic pressure;
    at least one accelerometer, said accelerometer being aligned with the normal axis of said airplane, producing a signal representing acceleration along said normal axis, including a component of gravity;
    devices to produce warning alarms; and
    a computer system responsive to said dynamic pressure signals and said acceleration signals to calculate the coefficient of lift of said airplane, to compare said coefficient against warning levels of sad coefficient, and to issue signals evoking said alarms if said comparison meets a given criterion.

2. Claim 1 wherein said level of dynamic pressure is used by said computer to calculate airspeed and to compare said calculated airspeed against levels not to be exceeded, and to issue signals evoking alarms if said levels are exceeded.

3. Claim 1 including gyros for sensing rate of angular change about al least one of three axes of motion of said airplane, said rate serving as input to said computer.

4. Claim 3 wherein said rate of angular change is used by said computer to determine the level of yaw rate of change and to compare it against levels not to be exceeded, and to issue signals evoking alarms if said levels are exceeded.

5. Claim 1 including computer analysis of dangerous states based upon, sensor outputs to produce directives for restoration of said airplane to safe operation.

6. Claim 1 as implemented using a smartphone to provide said normal accelerometer and said computer, together with an input from said dynamic pressure signal.

7. A dangerous aerodynamic state warning device for an airplane experiencing normal acceleration and accepting static and pitot pressure inputs, comprising
- a sensitive mass that is subjected to a force of acceleration in a direction substantially aligned with the lift vector applied to the wings of said airplanes;
- a device operatively connected to said mass and having an area upon which said static and pitot pressures act together to create a dynamic force applied upon said mass in opposition to said acceleration force;
- adjustable orifices between said pressure inputs that permit substantially proportional reductions of said dynamic force;
- a sensor to detect the consequence of said forces applied upon said mass; and
- a device to produce an alarm signal when said sensor indicates that said acceleration force is greater than said dynamic force.

* * * * *